(12) United States Patent
Rygaard et al.

(10) Patent No.: US 8,251,316 B2
(45) Date of Patent: Aug. 28, 2012

(54) CONFORMAL AIRLOCK ASSEMBLY AND METHOD

(75) Inventors: Christopher A. Rygaard, Huntsville, AL (US); Danilo Viazzo, Dublin, CA (US)

(73) Assignee: Christopher A. Rygaard, Huntsville, AL (US)

( * ) Notice: Subject to any disclaimer, the term of this patent is extended or adjusted under 35 U.S.C. 154(b) by 0 days.

(21) Appl. No.: 13/186,312

(22) Filed: Jul. 19, 2011

(65) Prior Publication Data

US 2011/0278400 A1  Nov. 17, 2011

Related U.S. Application Data

(62) Division of application No. 11/871,014, filed on Oct. 11, 2007, now Pat. No. 7,997,537.

(60) Provisional application No. 60/851,115, filed on Oct. 11, 2006.

(51) Int. Cl.
*B64G 1/60* (2006.01)
(52) U.S. Cl. ................................................... 244/171.9
(58) Field of Classification Search .... 244/159.4–159.5, 244/172.4, 172.5, 173.1, 173.3; 49/366–370; 414/217, 221; 14/335
See application file for complete search history.

(56) References Cited

U.S. PATENT DOCUMENTS

| | | | |
|---|---|---|---|
| 1,070,639 A | 8/1913 | Topper | |
| 3,161,925 A | 12/1964 | Bertolini | |
| 3,537,668 A | 11/1970 | Kosmo et al. | |
| 3,639,934 A | 2/1972 | Eggert, Jr. | |
| 3,952,976 A | 4/1976 | Fletcher et al. | |
| 4,120,067 A | 10/1978 | Hone et al. | |
| 4,669,413 A | 6/1987 | Cummins | |
| 4,860,975 A * | 8/1989 | Schliesing et al. | 244/172.4 |
| 5,580,013 A * | 12/1996 | Velke | 244/159.5 |
| 6,499,697 B1 | 12/2002 | Patel et al. | |
| 6,786,456 B2 | 9/2004 | Veal et al. | |
| 7,237,524 B2 | 7/2007 | Pelrine et al. | |

* cited by examiner

*Primary Examiner* — Tien Dinh
(74) *Attorney, Agent, or Firm* — Beyer Law Group LLP

(57) ABSTRACT

A conformal airlock assembly for ingress and egress through a door from a high pressure environment to a low pressure environment. The airlock assembly includes a flexible, gas impermeable membrane that cooperates with a support wall in an airtight manner to form an interior pocket over the door on one side of the wall. A gas displacement system, in flow communication with the interior pocket, is selectively operable to flow air out of the interior pocket, collapsing the membrane toward a collapsed condition. An actuation system coupled to the flexible membrane is operable to displace the flexible membrane, in the collapsed condition, away from the one side of the support wall. Such displacement of the airtight membrane creates a low pressure space in the pocket that is selected to be sufficiently proximate that of the low pressure environment. Hence, the door may be opened to permit ingress and egress therethrough without a large pressure differential.

14 Claims, 13 Drawing Sheets

CONFORMAL AIRLOCK ASSEMBLY AND METHOD

RELATED APPLICATION

This application is a Divisional of U.S. patent application Ser. No. 11/871,014 filed Oct. 11, 2007, entitled, "CONFORMAL AIRLOCK ASSEMBLY AND METHOD", which claims priority to U.S. Provisional Patent Application No. 60/851,115, filed Oct. 11, 2006, entitled "CONFORMAL AIRLOCK ASSEMBLY AND METHOD", both of which are herein incorporated by reference in its entirety for all purposes.

FIELD OF THE INVENTION

The present invention relates in general to an airlock assembly, and more particularly, to a conformal airlock assembly particularly suitable for manned spaceflight.

BACKGROUND OF THE INVENTION

Airlock assemblies have been used in space operations for human cargo space vehicles such as the U.S. Space Shuttle, as well as for space station entry and egress. Nearly all airlock assemblies are rigid wall structures that have a volume appropriate to the egress/ingress requirements of the items or humans to be accommodated. This type of rigid structure airlock is very time inefficient for ingress and egress, consumes space, expends excess energy, and a loses a significant amount of air with each cycle.

Other airlock designs include shaped airlocks which are essentially a Rigid Chamber airlocks, except the rigid chamber is shaped to match the shape of the astronaut. By shaping the rigid chamber, the volume to be evacuated and pressurized during egress and ingress is reduced, thereby reducing the drawbacks of the Rigid Chamber airlock. However, with this design, the airlock is effective with only those items of a size and shape to match the rigid chamber.

Another airlock design is a Plastic Displacement airlock system which comprises a chamber and some plastic or fluid material that floods the chamber to displace the air. This greatly reduces the air lost on each cycle. However, the amount of plastic material required to flood the chamber can result in excess weight, and it is not clear how the plastic material can be controlled to prevent it from spilling into the interior or exterior of the vehicle.

Lastly, Suit Dock airlock systems have been designed which comprise a space suit and a docking mechanism between the space suit and the space vehicle. With this design, the suit never enters the vehicle, and the astronaut must climb out of the suit and through the dock to enter the vehicle. This design allows for better dust control, as when used on a planetary surface. It also reduces cycle time, energy consumption, and air loss. However, it is strictly limited to moving personnel into and out of the space vehicle.

Accordingly, there is a need for a simple, compact airlock assembly and method for use in space operations where storage and living space is at a premium.

SUMMARY OF THE INVENTION

The present invention is directed toward a conformal airlock assembly to permit ingress and egress through a door of a support wall from a relatively high pressure environment on one side of the support wall to a relatively low pressure environment on the other side of the support wall. The airlock assembly includes a flexible, gas impermeable membrane cooperating with the support wall in an airtight manner to form an interior pocket over the door on the one side of the support wall. An airtight resealable seam is included that cooperates with the membrane to form an opening into the interior pocket from the one side of the support wall. The resealable seam is selectively operable from an open condition, permitting passage through the opening and into the interior pocket, to a closed condition, forming an airtight seal. A gas displacement system is oriented and positioned in flow communication with the interior pocket. This system is selectively operable to flow air into the interior pocket toward a non-collapsed condition for the membrane, and to flow air out of the interior pocket toward a collapsed condition for the membrane. The airlock assembly further includes an actuation system coupled to the flexible membrane which is operable to displace the flexible membrane, in the collapsed condition, away from the one side of the support wall. Such displacement of the membrane is toward a displaced condition, creating a low pressure space in the interior pocket, until the pressure within the interior pocket is sufficiently proximate to that of the relatively low pressure environment on the other side of the support wall. Hence, the door may be opened to permit ingress and egress therethrough without a large pressure differential between the pressure within the interior pocket and that on the other side of the support wall.

Accordingly, upon egress, the gas displacement system displaces air from inside the interior pocket of the membrane toward the collapsed condition. In this state, the membrane conforms around anything contained in the membrane, similar to vacuum packaging. Within the airtight interior pocket, the pressure is lowered further by operating the actuators, separating and displacing the conformed membrane, in the collapsed state, away form the support wall. This creates a low or negative pressure (i.e., a vacuum) with in the interior pocket which is adjusted to be sufficiently proximate to that of the relatively low pressure environment on the other side of the support wall. The door, accordingly, can then be safely opened.

In one specific embodiment, the airtight resealable seam is provided by any one of a resealable airtight ZIPLOCK® or ZIPPER®-style component. In addition, an overlapping metallic hook type-system and an airtight VELCRO® component may be included as well.

In another embodiment, the actuator apparatus includes one or more actuator devices. Each actuator device having one end coupled to the flexible membrane at spaced-apart locations thereof, and each having opposite ends fixedly mounted to a support structure to one of push and pull the flexible membrane. One end of each actuator device is coupled to the flexible membrane from either inside the interior pocket to push the flexible membrane away from the door, to create the lower pressure space; or outside the interior pocket to pull the flexible membrane away from the door, to create the lower pressure space.

In still another specific configuration, the gas displacement system includes a 2-way valve to selectively permit the passage of air through the displacement system. The gas displacement system cooperates with one of the flexible membrane and the support wall to permit the flow of air therethrough.

Yet another specific embodiment provides a gas permeable membrane that includes a metallic reinforced backing, particularly at the regions mounted to the ends of the actuator devices.

In another specific aspect, the present invention provides a space vehicle that incorporates a conformal airlock assembly.

The space vehicle includes a hull body that defines an interior cavity, and a door to permit ingress and egress to and from the hull body. A conformal airlock assembly, in accordance with the present invention, is included for ingress and egress through the door due to the high pressure differential from the relatively high pressure environment in the interior cavity of the hull body to a relatively low pressure environment outside of the hull body. The airlock assembly includes a flexible, gas impermeable membrane cooperating with the hull body in an airtight manner to form an interior pocket over the door on the interior cavity of the hull body, and a gas displacement system in flow communication with the interior pocket. This gas displacement system is selectively operable to flow air into the interior pocket toward a non-collapsed condition for the membrane, and out of the interior pocket toward a collapsed condition for the membrane. An actuation system is included that is coupled to the flexible membrane, and operable to displace the flexible membrane, when in the collapsed condition, away from the door to a displaced condition. In this manner, a low pressure space is created within the collapsed interior pocket, forming a vacuum. The level of the vacuum is attuned to be sufficiently proximate to that of the relatively low pressure environment outside of the hull body so that the door may be opened to permit ingress and egress therethrough in a safe manner.

In still another aspect of the present invention, a method for ingress and egress is provided through a door of a support wall for vehicles, modules and structures from a relatively high pressure environment inside the support wall to a relatively low pressure environment outside the support wall The method includes providing a flexible, gas impermeable membrane that cooperates with the support wall in an airtight manner to form an interior pocket over the door on the inside of the support wall, and displacing air from within the interior pocket of the membrane from a non-collapsed condition toward a collapsed condition. In the collapsed condition, the membrane is collapsed about the door on the inside of the support wall. The method further includes displacing the flexible membrane, in the collapsed condition, away from the door on the inside of the support wall, forming a low pressure space therein. The displacing the flexible membrane is performed until the level of the low pressure within the airtight interior pocket is sufficiently proximate to that of the relatively low pressure environment on the outside of the support wall. Subsequently, the method includes opening the door to permit ingress and egress therethrough In one specific embodiment, the method includes accessing the interior pocket of the membrane, in the non-collapsed condition, through an airtight resealable seam that cooperates with the membrane to form an opening into the interior pocket from the inside of the support wall. This is performed by selectively operating the resealable seam between an open condition, permitting passage through the opening and into the interior pocket, and a closed condition, forming an airtight seal. Just prior to accessing the interior pocket, the method include displacing air into the interior pocket of the membrane toward the non-collapsed condition until the pressure within the airtight interior pocket is sufficiently proximate to that of the relatively high pressure environment on the inside of the support wall.

In still another specific embodiment, the displacing the flexible membrane is performed by one or more actuator devices having ends coupled to the flexible membrane. In one configuration, the end of the actuator devices are coupled to the flexible membrane from an interior wall thereof, inside the interior pocket wherein the displacing the flexible membrane is performed by pushing the flexible membrane away from the door, to create the lower pressure space. In another configuration, the end of the actuator devices are coupled to the flexible membrane from an exterior surface thereof, outside the interior pocket, wherein the displacing the flexible membrane is performed by pulling the flexible membrane away from the door, to create the lower pressure space.

BRIEF DESCRIPTION OF THE DRAWINGS

The assembly of the present invention has other objects and features of advantage which will be more readily apparent from the following description of the best mode of carrying out the invention and the appended claims, when taken in conjunction with the accompanying drawing, in which:

DETAILED DESCRIPTION OF THE INVENTION

Figure 1:
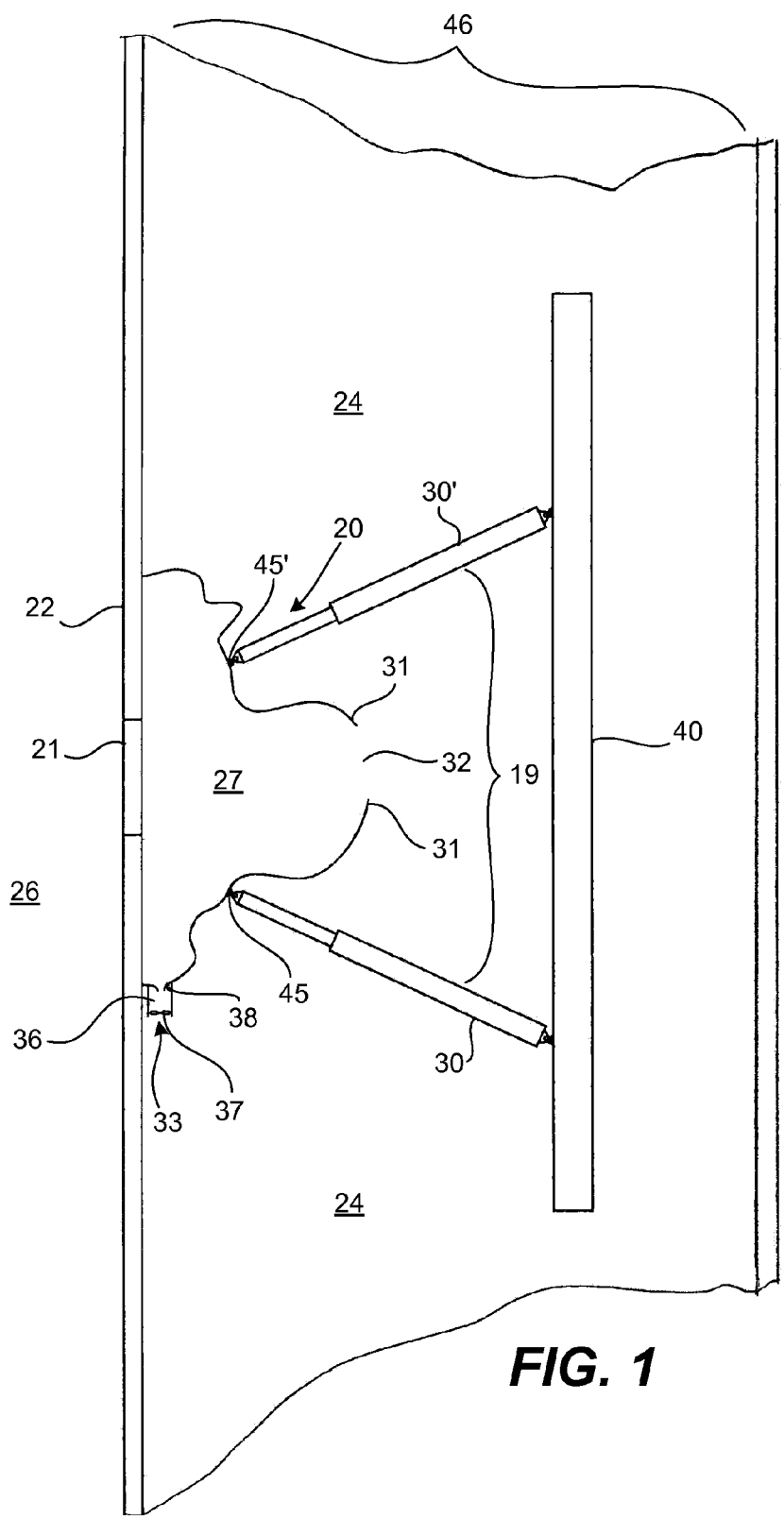
FIG. 1 is a fragmentary, side elevation view of a conformal lock assembly constructed in accordance with the present, and operationally mounted to a hull body of a spacecraft.
Figure 2:
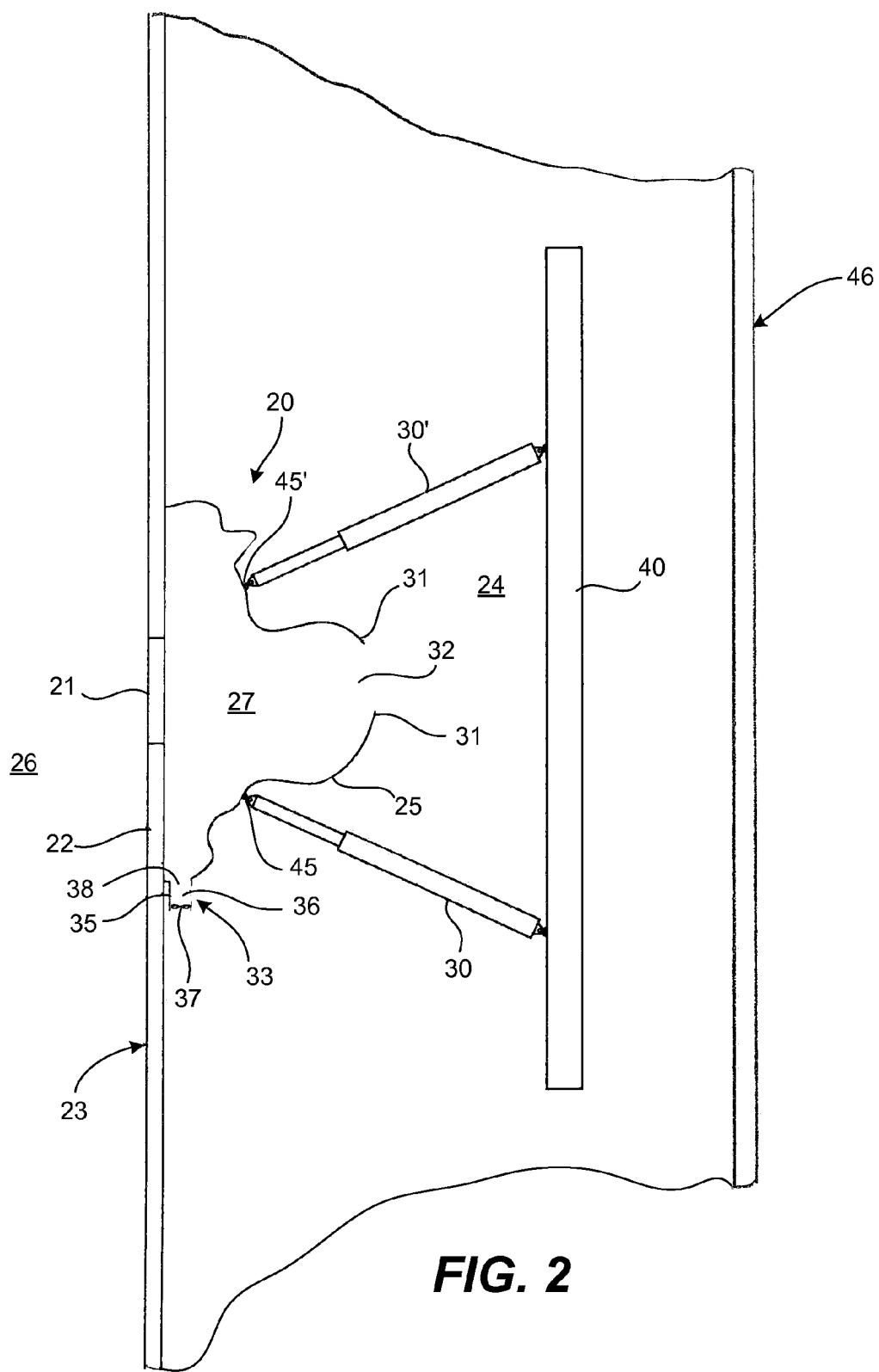
FIG. 2 is a fragmentary, side elevation view of the conformal lock assembly of FIG. 1, illustrating a resealable seam for a membrane in an opened condition.
Figure 3:
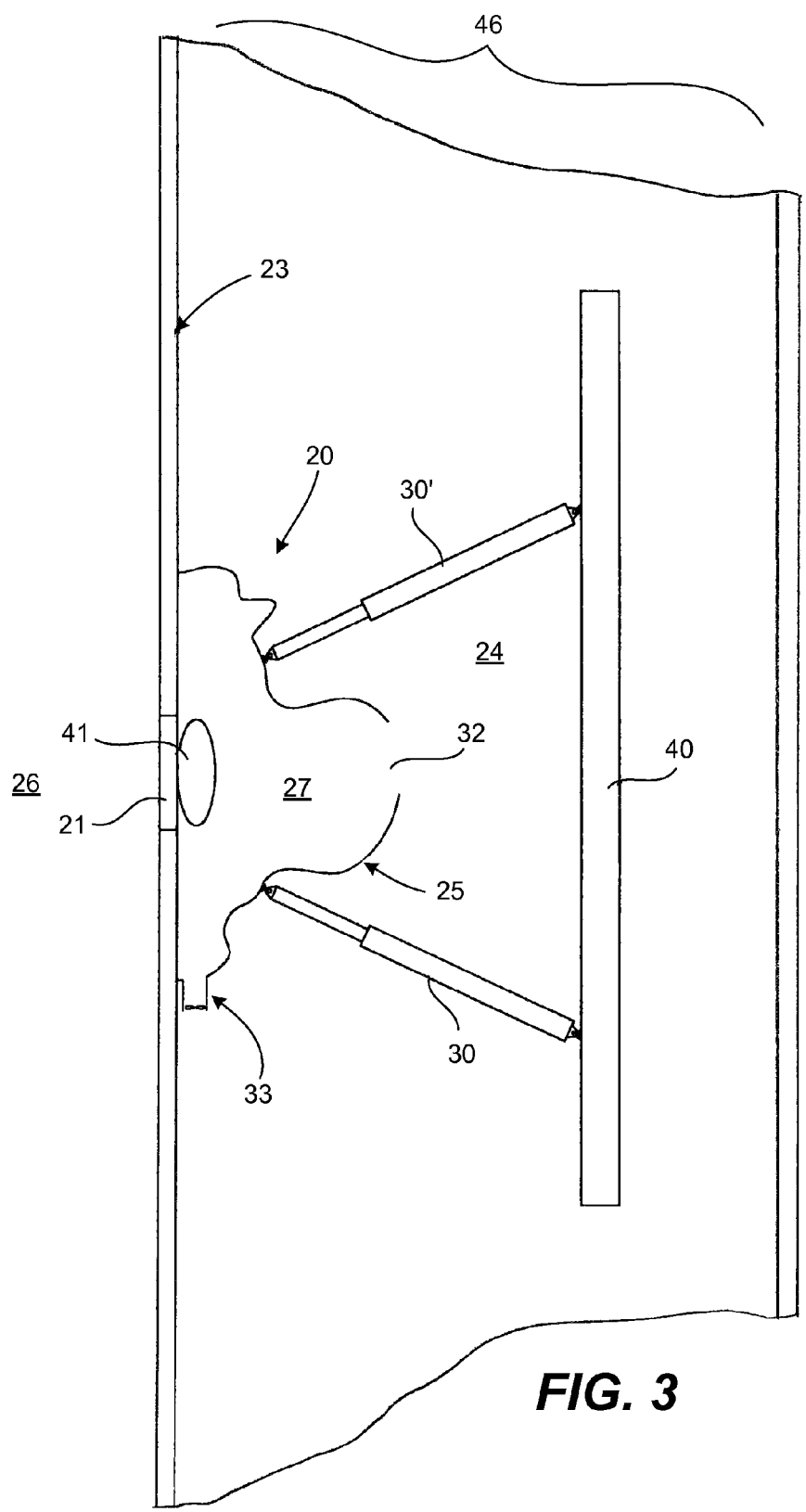
FIG. 3 is a fragmentary, side elevation view of the conformal lock assembly of FIG. 2, illustrating an object place within an interior pocket of the membrane.

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Referring now to FIGS. 1-10, the conformal airlock assembly, generally designated 20, is provided to permit ingress and egress through a door 21 of a support wall (e.g., hull wall 22) from a relatively high pressure environment on one side 24 of the support wall 22 to a relatively low pressure environment on the other side 26 of the support wall. The present invention is particularly suitable for situations involving the ingress and egress through support walls separating large pressure differentials environments, such as for space crafts were the internal hull pressure is generally in the range of about one atmosphere and the pressure outside the space craft (i.e., in space) is a vacuum or nearly a vacuum. That is, a high pressure side of the hull wall 22 is representative of the spacecraft interior 24, while a low pressure side of the hull wall 22 is representative of outside 26 of the spacecraft 23.

Figure 6:
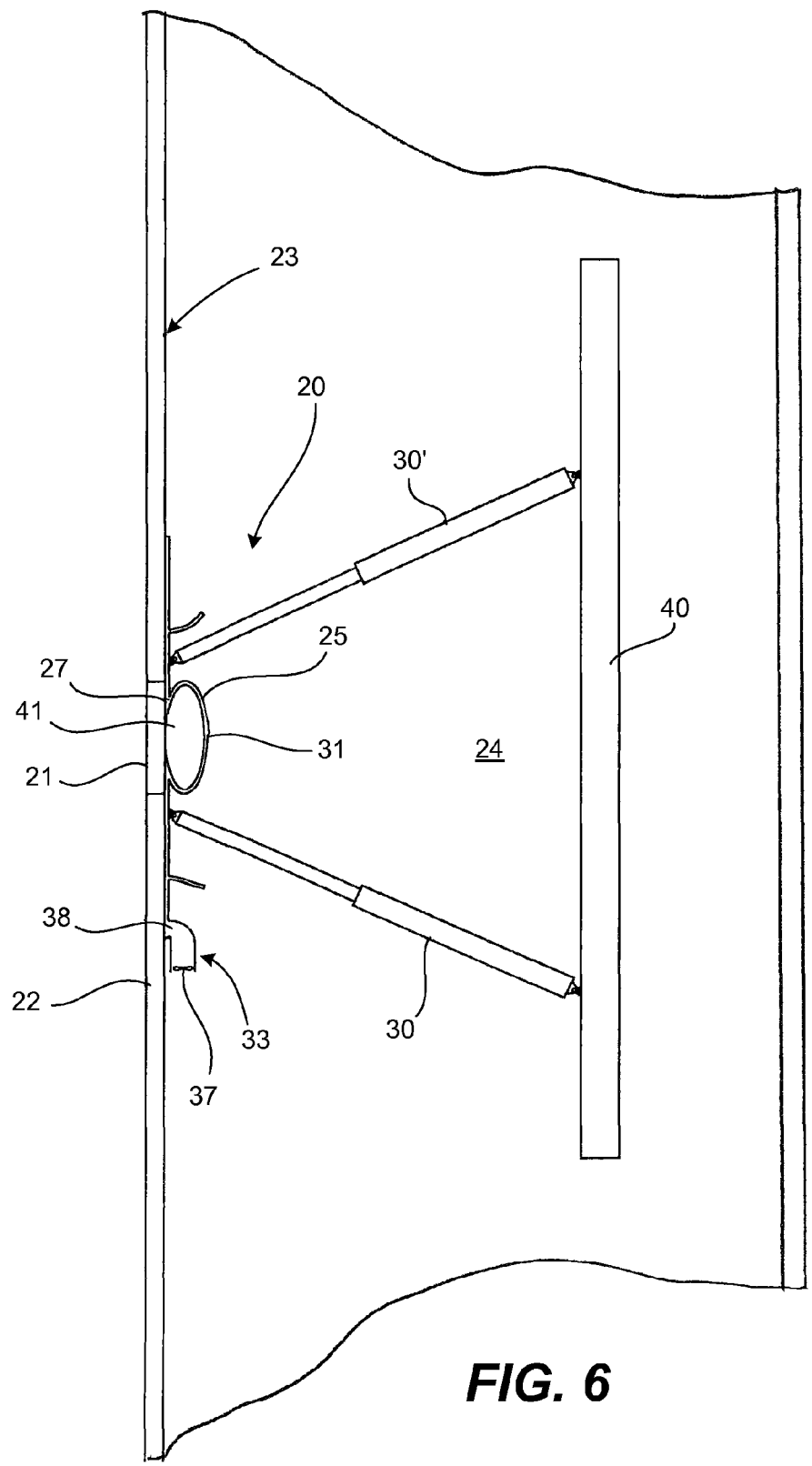
FIG. 6 is a fragmentary, side elevation view of the conformal lock assembly of FIG. 5, illustrating the membrane in the collapsed condition with the actuator devices in an extended condition.
Figure 7:
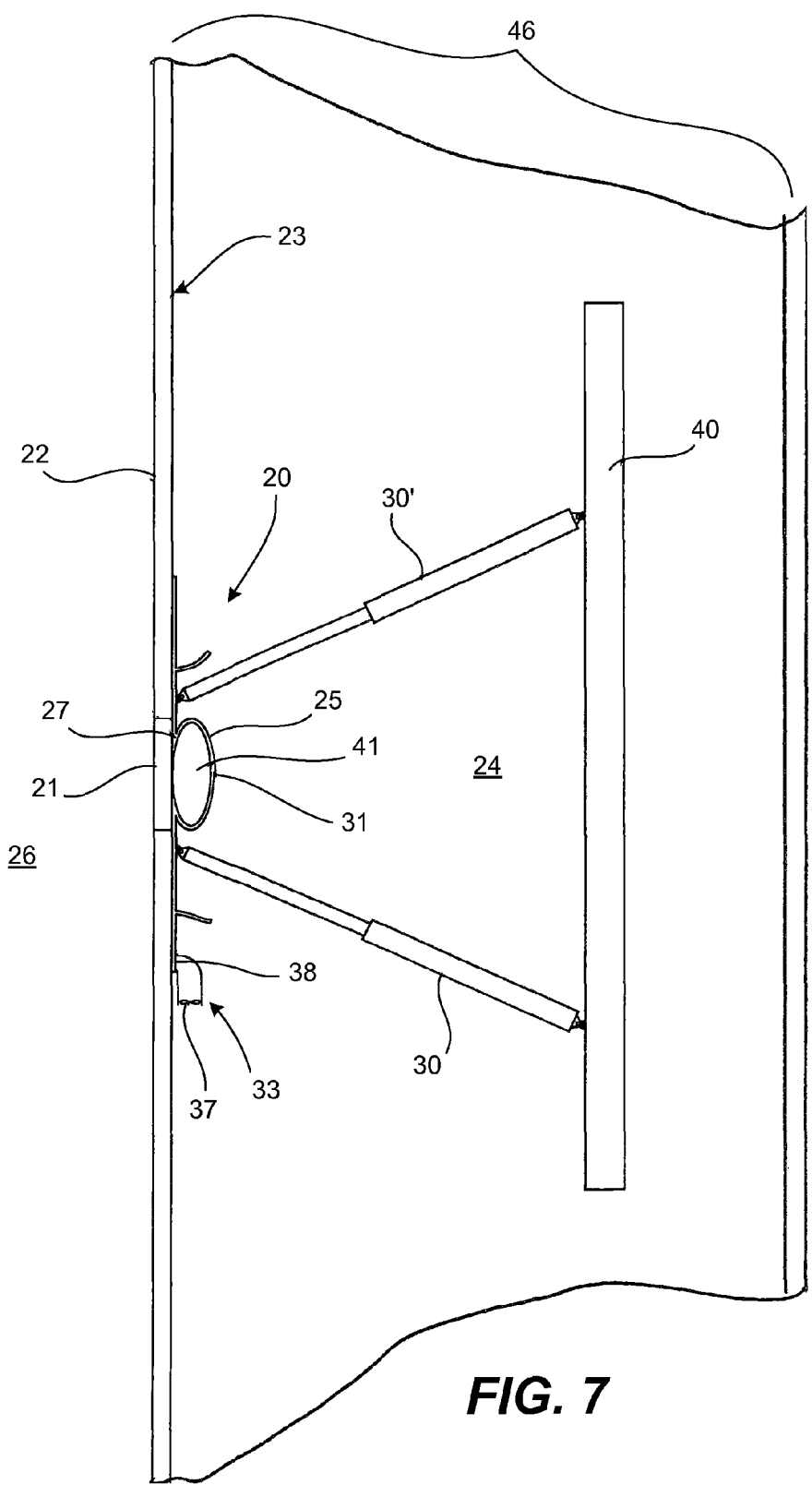
FIG. 7 is a fragmentary, side elevation view of the conformal lock assembly of FIG. 6, illustrating a valve device of the gas displacement system in a closed condition.

The airlock assembly 20 includes a flexible, gas impermeable membrane 25 that cooperates with the support wall 22 in an airtight manner to form an interior pocket 27 over the door 21 on the one side (hence forth, interior cavity 24) of the support wall 22. A gas displacement system, generally designated 33, is oriented and positioned in flow communication with the interior pocket 27, and is selectively operable to flow air into and out of the interior pocket 27. As will be described in greater detail below, when air is flowed into the interior pocket 27, the flexible membrane is essentially inflated and pressurized to a level substantially close to that of the pressure on the interior of the hull, as shown in the non-collapsed condition of the membrane 25 in FIG. 4. When the air is flowed out of the interior pocket 27, via gas displacement system 33, the membrane is essentially deflated and depressurized, at least to the extent capable by the gas displacement system (as will be described). As shown in FIGS. 6 and 7, in a collapsed condition, the flexible membrane collapses and conforms around the object within the interior pocket 27 therein.

Once in the collapsed condition, the flexible membrane 25 which is airtight sealed and conformed about object 41, is drawn away from the object 41 or door 21 (FIG. 8), creating a low pressure space 18 and a vacuum or near vacuum therein. This is performed by an actuation system, generally designated 19, which is coupled to the flexible membrane 25. As mentioned, this system is operable to displace the flexible membrane, in the collapsed condition, away from the one side of the support wall 22. Such displacement of the membrane 25 is toward a displaced condition (FIG. 8), creating the low pressure space 18 in the interior pocket 27, until the pressure within the interior pocket is sufficiently proximate to that of the relatively low pressure environment on the other side 26 of the support wall 22. When the low or negative pressure created inside the low pressure space 18 of the interior pocket 27 of the membrane is sufficiently close to that outside the hull wall 22, the door 21 may be safely opened to permit ingress and egress therethrough.

Accordingly, a relatively simple and cost effective airlock is provided that can be easily altered to accommodate any application involving large pressure differentials. Other advantages include rapid ingress and egress, as well as reduced air loss and power consumption compared to other airlock systems.

Figure 11:
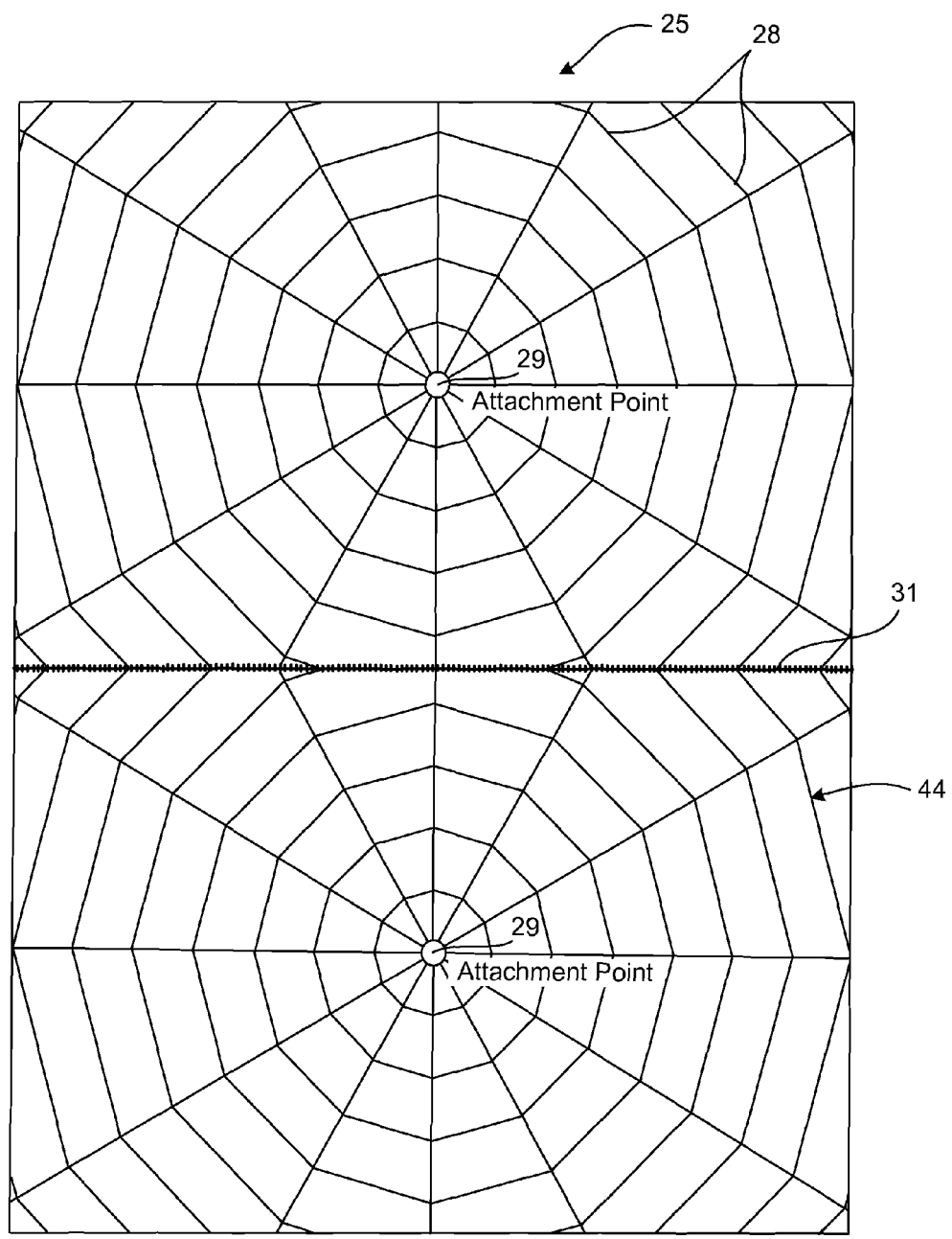
FIG. 11 is a top plan view of one specific embodiment of the membrane present invention, showing a spider web pattern of a metallic reinforced backing of the membrane.
Figure 12:
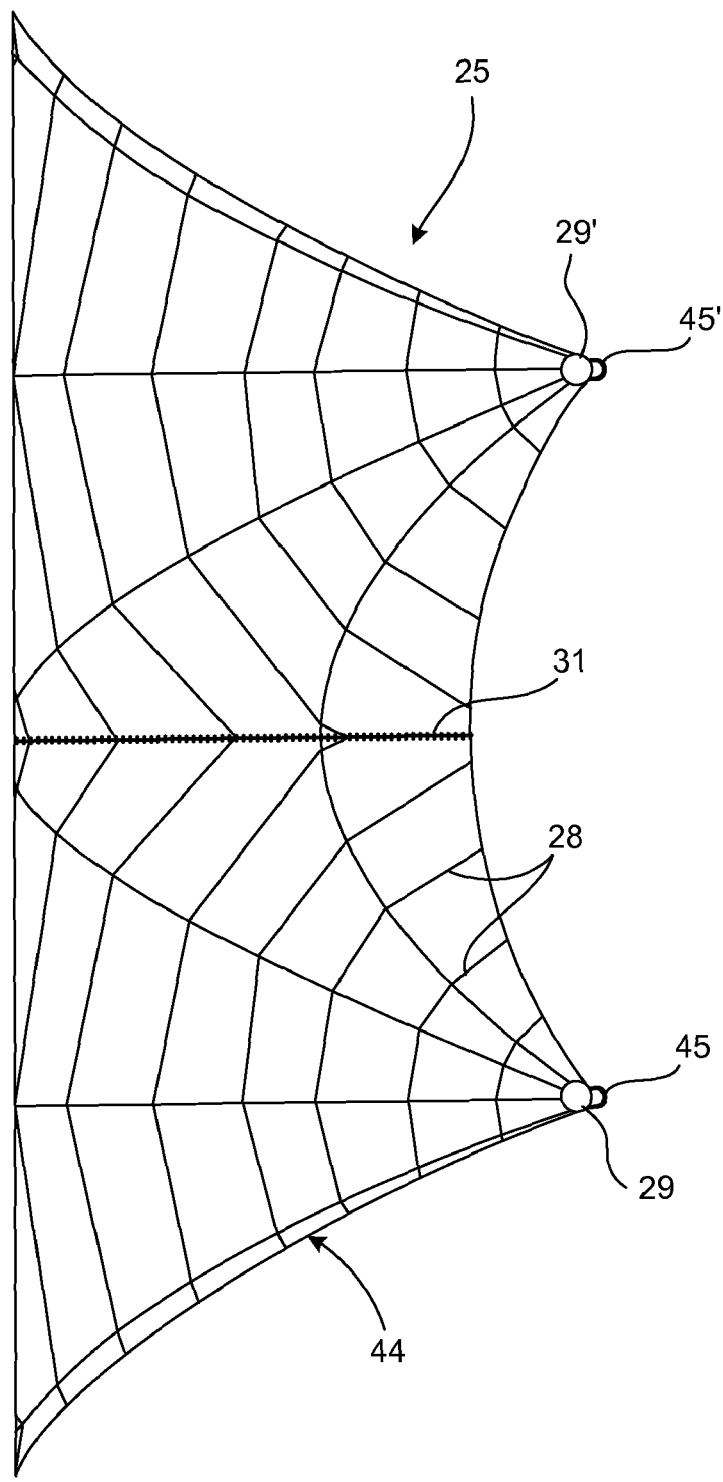
FIG. 12 is a side elevation view of the membrane of FIG. 11, illustrating movement thereof to the displaced condition.

Referring now to FIGS. 1, 11 and 12, the flexible membrane 25 of the airlock assembly 20 is gas impermeable or impervious so that an airtight interior pocket 27 can be created. The membrane 25, as mentioned, must also be sufficiently flexible to provide the conformal interior pocket 27.

The flexible membrane 25 is also preferably non-elastic, although an elastic membrane may suffice. One example of a suitable material as a plastic membrane reinforced with a metal backing 44 (FIGS. 11 and 12). For instance, the plastic membrane should be sufficiently thick or have sufficient structural integrity so as to be capable of withstanding such larger pressure differentials in outer space, while at the same time be sufficiently thin or flexible to permit at least partial conformation around objects, in the collapsed condition. Too thick or too nonflexible a membrane material is disadvantageous in that the ability to conform around the objects 41 in the interior pocket in the collapsed condition is significantly reduced. Briefly, it will be appreciated that while significant conformation about the object 41 in the membrane pocket xx is desirable, in the collapsed state, it need not be full conformation as long as a sufficient low pressure can be created during movement of the membrane to the displaced condition.

To counter the high loads and stresses acting upon the membrane by the actuation system 19, during displacement of the membrane and formation of the low pressure space 18, the metallic reinforcement backing 44 may be employed. By way of example, the metallic reinforcement backing 44 may be provided by a spider-web pattern of steel cable 28 or the like oriented around the two spaced-apart attachment points 29, 29' (two in this example in FIGS. 11 and 12). The attachment points 29, 29' may be include mounting links or brackets 45, 45' that are integrated into the flexible membrane and connected to the steel cables 28 in a load bearing manner. These brackets 45, 45' are further configured to attach to the actuation system 19 such that during operation of the actuation system, the loads are distributed throughout the metallic reinforcement rather than the membrane material itself.

Figure 13:
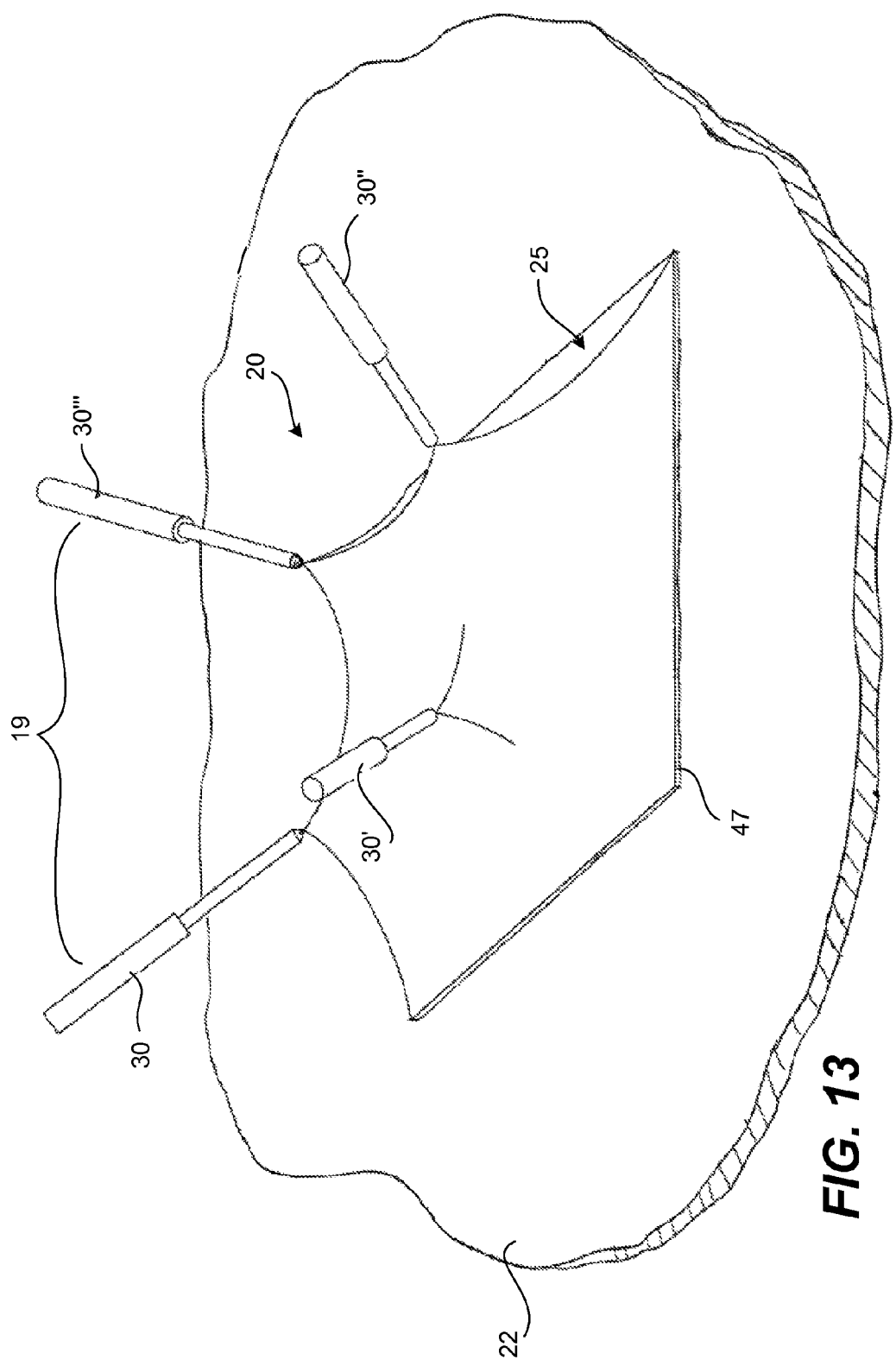
FIG. 13 is top perspective view of the conformal lock assembly of FIG. 1, illustrating an actuation system that incorporates multiple actuation devices, in the displaced condition.

To provide an airtight interior pocket, the membrane 25 and the hull body 46 cooperate to form an airtight seal therebetween. Using conventional airtight mounting techniques, the seam 47 (FIG. 13) at the intersection between the hull body 46 and the membrane 25 is airtight. In one particular embodiment, as shown in FIGS. 1 and 13, the membrane 25 is mounted to the interior side wall of the hull body 46.

In accordance with the present invention, the flexible membrane 25 includes one or more resealable seams 31 that define an opening 32 into the interior pocket 27. This resealable seam 31 is movable between an opened condition (FIGS. 1-3), permitting ingress and egress through the opening, and a closed condition (FIGS. 4-10), providing a resealable airtight closure of the opening 30 in the membrane, and thus the interior pocket 27 of the airlock assembly 20. Hence, during operation of the gas displacement system 33 and/or the actuation system 19, the resealable seam 31 must be positioned in the closed condition (FIGS. 4-10), airtight sealing the interior pocket 27. In contrast, during ingress and egress to and from the interior pocket 27 of the membrane, the resealable seam is oriented in the opened condition (FIGS. 1-3), permitting passage through the opening 32.

It will be appreciated, of course, that the interior pocket 27 of the membrane should be pressurized, and at the non-collapsed condition, before the resealable seam can be moved to the opened condition. Moreover, it will be understood that the resealable seam could be positioned between the hull wall 22 and the flexible membrane 25, as opposed to two opposed portions of the membrane.

This resealable seam 31 should be capable of sufficient structural integrity to withstand the pressure differential between the low pressure side outside 26 the spacecraft 23 and the high pressure side in the spacecraft interior 24, while at the same time be capable of forming a resealable airtight seal. The seam 31 includes an airtight resealable component capable of forming an airtight seal of the opening 32. Such a resealable airtight seam may be provided by an airtight ZIPLOCK® or ZIPPER®-style component.

While this resealable zipper-style component is capable of providing an airtight seal, it may lack sufficient structural integrity to maintain a seal under this type of application and/or pressure differential conditions it may experience in space. Thus, to maintain structural integrity under these types of loads, the resealable seam 31 may include an overlapping metallic hook system, VELCRO® component (similar to the overlapping VELCRO® systems disposed over zippers found in many coats), for example, that works in combination with the resealable zipper-type component.

Figure 4:
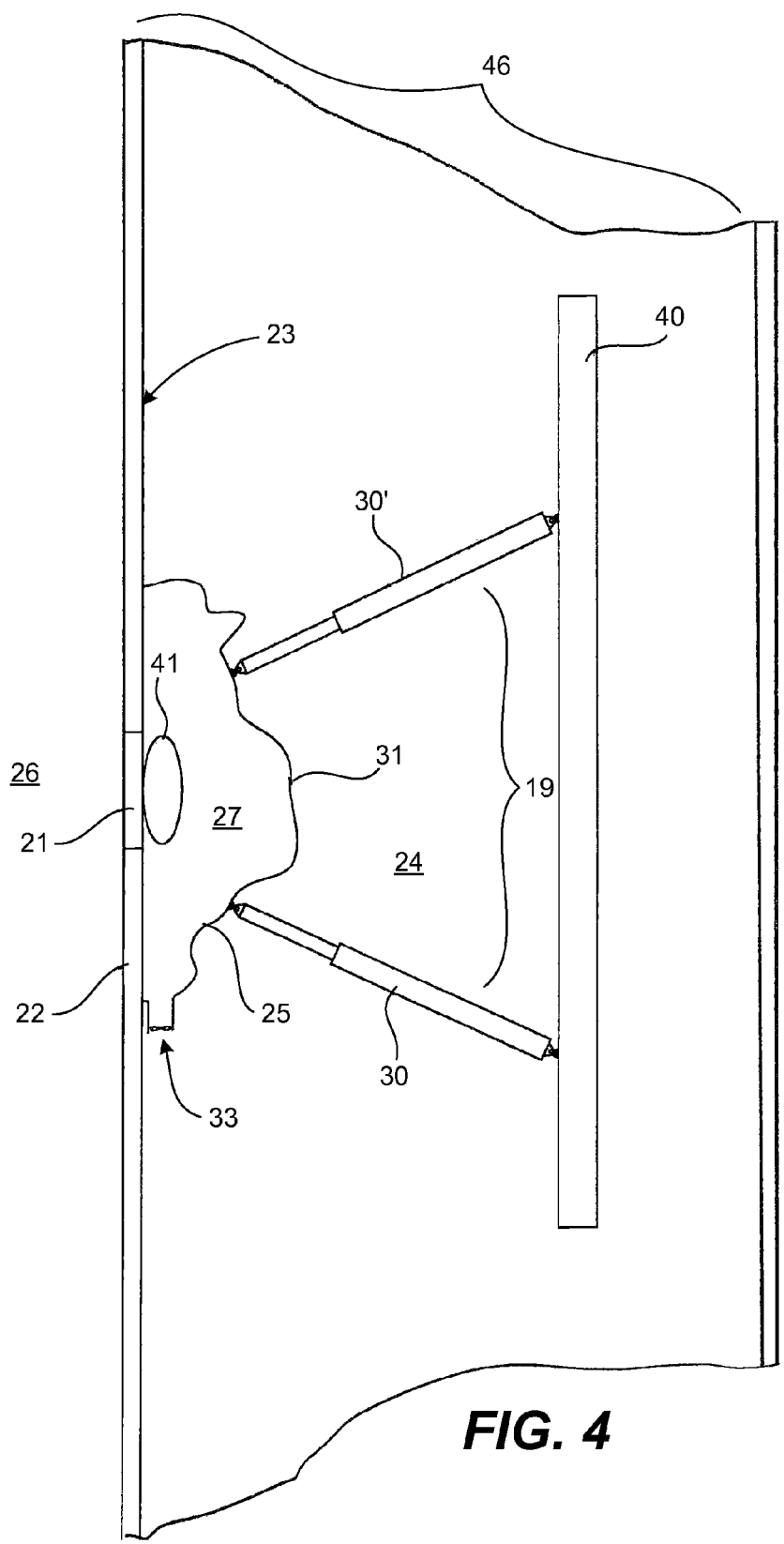
FIG. 4 is a fragmentary, side elevation view of the conformal lock assembly of FIG. 3, illustrating the resealable in a closed condition.
Figure 5:
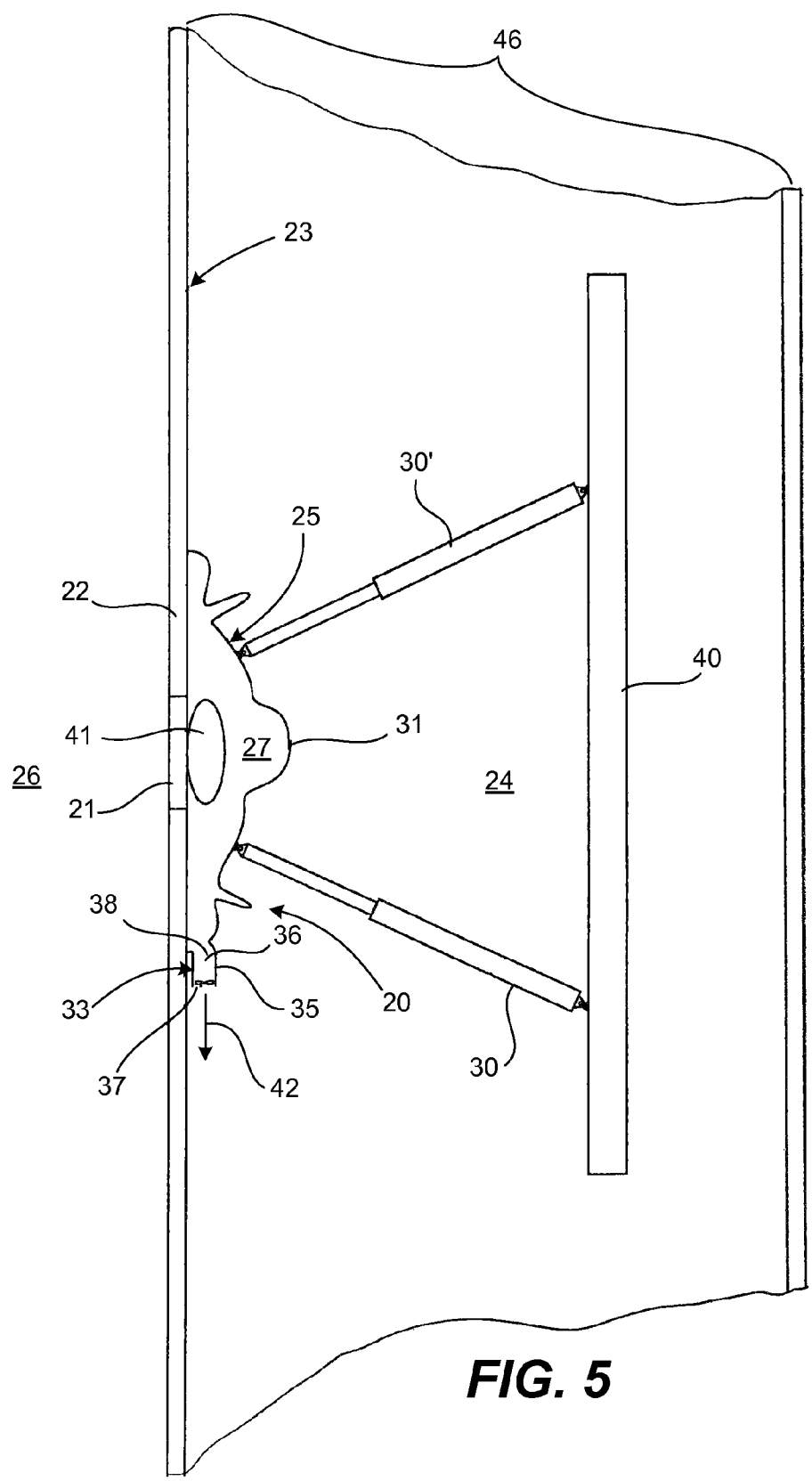
FIG. 5 is a fragmentary, side elevation view of the conformal lock assembly of FIG. 4, illustrating operation of a gas displacement system and deflation of the membrane.

Referring now to FIG. 5, the gas displacement system 33 of the airlock assembly 20 is shown which is employed to selectively displace gas into and out of the interior pocket 27 of the flexible membrane 25, between the non-collapsed condition (FIG. 4) and the collapsed condition (FIG. 6). This displacement system is in flow communication with the interior pocket 27 of the airtight membrane 25 to generate, utilize, and/or apply a pressure differential. Generally, by generating a positive pressure differential between the interior pocket 27 of membrane 25 and outside of the membrane (e.g., the interior of the hull body 46, gases will tend to flow out of the interior pocket of the airlock assembly 20. In contrast, creating a negative pressure differential will cause gases to flow into the interior pocket 27.

In one specific embodiment, the gas displacement system 33 includes a body 35 having a communication passage 36 with one end in fluid communication with the interior pocket 27 of the airlock assembly 20, and an opposite end communicating outside of the interior pocket. The displacement system 33 further includes a low pressure fan or pump device 37, or the like, operably disposed in the passage 36. This fan or pump device 37 creates or generates gas displacement to and from the interior pocket 27 of the membrane 25.

A fan with as little an output as about 0.005 PSI may be utilized, depending upon many factors such as the flexibility of the membrane, the desired capacity to collapse the membrane, etc.

Briefly, during operation of the gas displacement system to move the flexible membrane toward the collapsed condition from the non-collapsed condition (e.g., just prior to ingress or egress through the door 21, as will be described), the fan or pump device 37 operates to flow gases through the communication passage 36 in one direction (shown by arrow 42 in FIG. 5). As the gas flows out of the interior pocket 27, the membrane deflates and depressurizes the environment therein. The membrane then conforms around anything contained in the interior pocket 27, similar to vacuum packaging. In contrast, to move the flexible membrane toward the non-collapsed condition (e.g., just prior to opening of the resealable seam 31, as will be described), the fan or pump device 37 operates to flow gases through the communication passage 36 in the opposite direction. As the gas flows into of the interior pocket 27, the membrane 25 inflates and pressurizes the environment therein.

While the displacement system 33 is shown and illustrated as being integrated into and through the membrane 25, it will be appreciated that the system may be integrated into and through the hull wall 22 or other part of the spacecraft 23. Moreover, the system may comprise multiple fans/pump devices as opposed to only one fan/pump device as shown.

To assure that no air leakage occurs through the displacement system passage, a valve device 38 may be positioned in flow communication with the passage 36 of the body 35 to regulate the flow of air therethrough. In an opened condition of the valve device 38 (FIGS. 1-6), the gaseous flow is permitted through the communication passage 36, while in a closed condition (FIGS. 7-10), the gaseous flow therethrough is blocked. The valve device 38 may be provided by any two-way valve. When the gas displacement system 33 utilizes a pump-type device as opposed to a fan device, such a valve device 38 may be unnecessary in some instances.

In accordance with the present invention, the airlock assembly 20 includes the actuation system 19 that is applied to displace the flexible membrane 25, from the collapsed condition (FIGS. 6 and 7) toward the displaced condition (FIG. 8), creating the low pressure space 18 and a negative pressure or vacuum within the interior pocket 27 thereof. As mentioned, such displacement the flexible membrane 25 is in a direction away from the one side of the support or hull wall 22, and into the interior cavity 24 of the hull body 46, and by an amount sufficient to drop the internal pressure of the low pressure space 18 to the level sufficiently proximate to that outside of the hull body (e.g., vacuum or near vacuum).

In the preferred embodiment, the actuation system includes one or more actuator devices 30, 30', each having one end coupled to the flexible membrane 25 at the corresponding attachment points 29, 29' and opposite ends anchored to an object sufficiently stable to enable relative movement of the respective one ends. In one specific embodiment, as shown in FIG. 13, multiple actuator devices 30, 30', 30" and 30''' are applied to assure an appropriate low pressure space 18 is achieved. As will be described in greater detail below, the actuator devices 30, 30' are applied to move the membrane 25, at the attachment points 29, 29', in a manner expanding the interior pocket 27 defined between the hull wall 22 and the membrane 25, and forming a vacuum therein by such displacement.

As best illustrated shown in the embodiments of FIGS. 8-12, the actuator devices 30, 30' are mounted to the exterior surfaces of the membrane 25, via the respective brackets 45, 45' of attachment points 29, 29'. In the configuration, hence, the actuator devices are operated pull respective portions of the membrane 25 away from the hull wall 22, creating the low pressure space 16. As already indicated, one end of each actuator devices 30, 30' is mounted the linkage components 45, 45' of the corresponding attachment points 29, 29'. These attachment points provide sufficient strength and stability to the membrane, as well as distribute the significant loads generated by the actuator devices acting upon the membrane during movement thereof to the displaced condition (FIG. 6). The opposite ends of the actuator devices 30, 30', in contrast, are respectfully fixedly mounted to a bulkhead or similar support structure 40 fixed within the interior 24 of the spacecraft 23. Such a support structure must be sufficient strong to withstand such loads, and enable proper operation of the actuator devices.

Briefly, referring now to FIGS. 5-8, to create a vacuum within the interior pocket 27 of the airlock assembly 20, the gas displacement system 33, via fan/pump device 37, is operated to draw gases from the interior pocket of the membrane 25, toward the collapsed condition (FIGS. 5-6). Once the membrane 25 is collapsed, and conformed around the object 41 contained in the interior pocket 27 (the object 41, of course, is not required to be placed within the interior pocket 27 in order to create a vacuum), the valve device 38 is moved to the closed condition (FIG. 7), the interior pocket 27 is then maintained in the collapsed state and is airtight. The actuator devices 30, 30' are then operated to move the attachment points 29, 29' away from the hull wall (in a vacuum state (FIGS. 8-10), pulling the membrane along therewith. Consequently, the created low pressure space 18 of the interior pocket 27 is expanded, creating a vacuum therein.

In another specific embodiment, the actuator devices may be disposed within the interior pocket 27 of the airlock assembly 20 (not shown), having an opposite end mounted to the hull wall 22 or analogous support structure of the spacecraft 23. Accordingly, rather than pulling the membrane away from the hull wall 22 from the collapsed condition to the displaced condition, as in the previous embodiment, these internal actuator devices are actuated to push the membrane away from the hull wall.

These actuators can be any type mechanism capable of displacing the membrane away from the hull wall under these loads, depending upon the number of actuators, and desired level of the negative pressure created. Such systems include pneumatic, hydraulic, cable driven mechanisms, etc., to name a few.

Referring now to FIGS. 3-10, egress or exit from the airlock assembly 20 will be described in detail. With the door 21 in the closed position, the gas displacement system 33 is actuated, if necessary, to pressurize the interior pocket 27 of the membrane 25 to a level substantially proximate that of the interior cavity 24 of the hull body 46. Initially, this may be substantially performed by opening the 2-way valve 38 of the displacement system 33 (i.e., should the gas displacement system 33 include a fan device 37. In this manner, the resealable seam 31 of the membrane can be safely moved to the opened condition without a significant pressure differential between the interior pocket 27 and the interior cavity 24 of the hull body 46 outside of the membrane 25.

Once the resealable seam has been moved opened condition, the object 41 can be placed through the opening 32, and into the interior pocket 27 of the membrane 25. The object is preferably placed in the interior pocket 27. While the illustrations show positioning of the object near or adjacent the backside of the door 21 (FIG. 3), the object may be positioned anywhere within the membrane pocket.

Referring now to FIG. 4, the airtight resealable seam 31 is moved to a sealed closed condition, airtight sealing the interior pocket 27 from the interior cavity 24 of the hull body 46. The gas displacement system 33 can then be actuated together with the valve device 38 in the opened condition. For example, as shown in FIG. 5, the fan device 37 is actuated, moving the air in the direction of arrow 42, drawing gases out of the interior pocket 27 and deflating the membrane 25. At the same time, the actuator devices 30, 30' can be actuated (either extended or retracted, depending upon whether the actuators are exterior or interior to the membrane) to allow full conformity of the membrane 25 about the object 41 toward the collapsed condition.

Once the membrane 25 is fully deflated and depressurized by the fan device 37 (in the collapsed condition), the flexible membrane 25 conforms around the object 41 to be moved (FIG. 6), similar to vacuum packaging. Subsequently, to airtight seal the interior pocket and maintain the deflated nature of the membrane 25, the 2-way valve 38 is moved from the opened condition to the closed condition (FIG. 7).

In accordance with the present invention, the airlock assembly 20 is now in condition to depressurize the interior pocket 27. Referring now to the embodiment of FIGS. 8 and 9, the actuator devices 30, 30' can be actuated and retracted, pulling the membrane 25 away from the hull wall 22, and increases the low pressure space 18 within the interior pocket 27 of the membrane 25. Due to the sealed, deflated, near vacuum state the membrane 25, in the collapsed condition, displacing portions of the membrane 25 away from the hull wall 22 creates a vacuum in the interior pocket 27 between the hull wall 22 and the membrane 25.

Each actuator device 30, 30' may be operated independently and/or displace the respective portions of the membrane away from the hull wall different distances. It is the total volume of the low pressure space 18, in the displaced condition that determines level of the negative pressure or vacuum created. That is, it is preferable to displace the membrane 25 a sufficient distance away from the hull wall 22 in order to create a vacuum approximate or similar to the low pressure outside 26 of the hull wall 22. In other words, the pressure differential between the low pressure created in the low pressure space and that outside the hull body must be sufficiently low so as to enable safe and free opening of the door 21.

Figure 9:
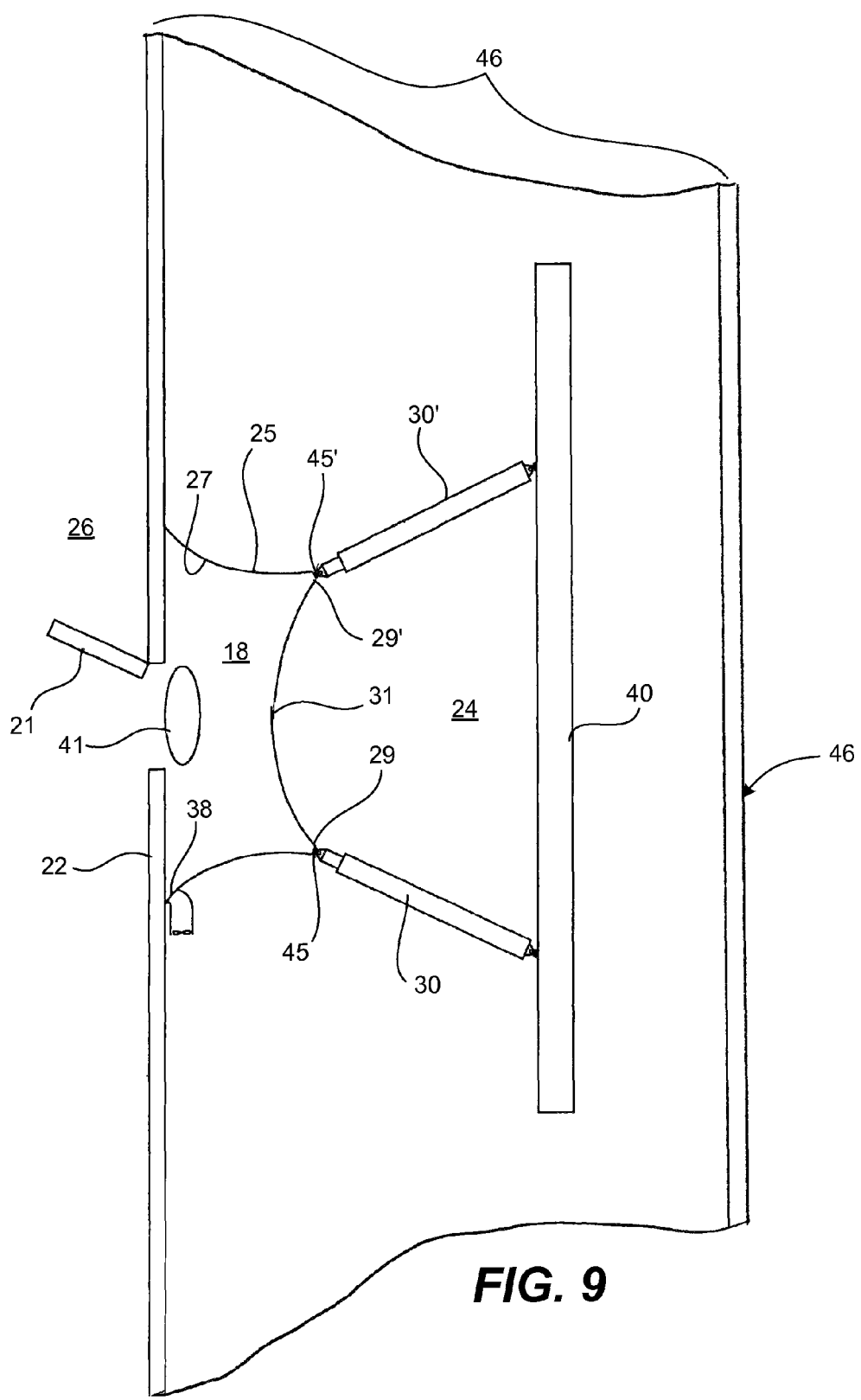
FIG. 9 is a fragmentary, side elevation view of the conformal lock assembly of FIG. 8, illustrating movement of the door to an opened condition.

Once the created negative pressure is with in a safe pressure differential with that outside the hull body (e.g., vacuum or near vacuum), the door 21 can then be safely and freely opened. In effect, interior cavity 24 of the spacecraft 23 is isolated from the exterior 26 thereof (FIG. 9). Subsequently, as best viewed in FIG. 10, the object 41 can then be removed from the craft.

For ingress through the airlock assembly 20 of the present invention, it is operated essentially in a manner reverse to the steps for egress. First, if the airlock assembly 20 was not just previously used for egress therefrom, with the door 21 closed, the resealable seam 31 must be moved to the closed condition, forming an airtight seal thereat. The gas displacement system 33 is then operated to flow gases out of the interior pocket 27, collapsing the membrane 25 from the non-collapsed condition to the collapsed condition. With the valve device 38 in the opened condition, the fan device 37 is operated to remove gas from the interior pocket 27, depressurizing the flexible membrane 25. As previously mentioned, the actuator devices 30, 30' may simultaneously be operated to enable full collapse of the membrane to the collapsed condition.

Figure 8:
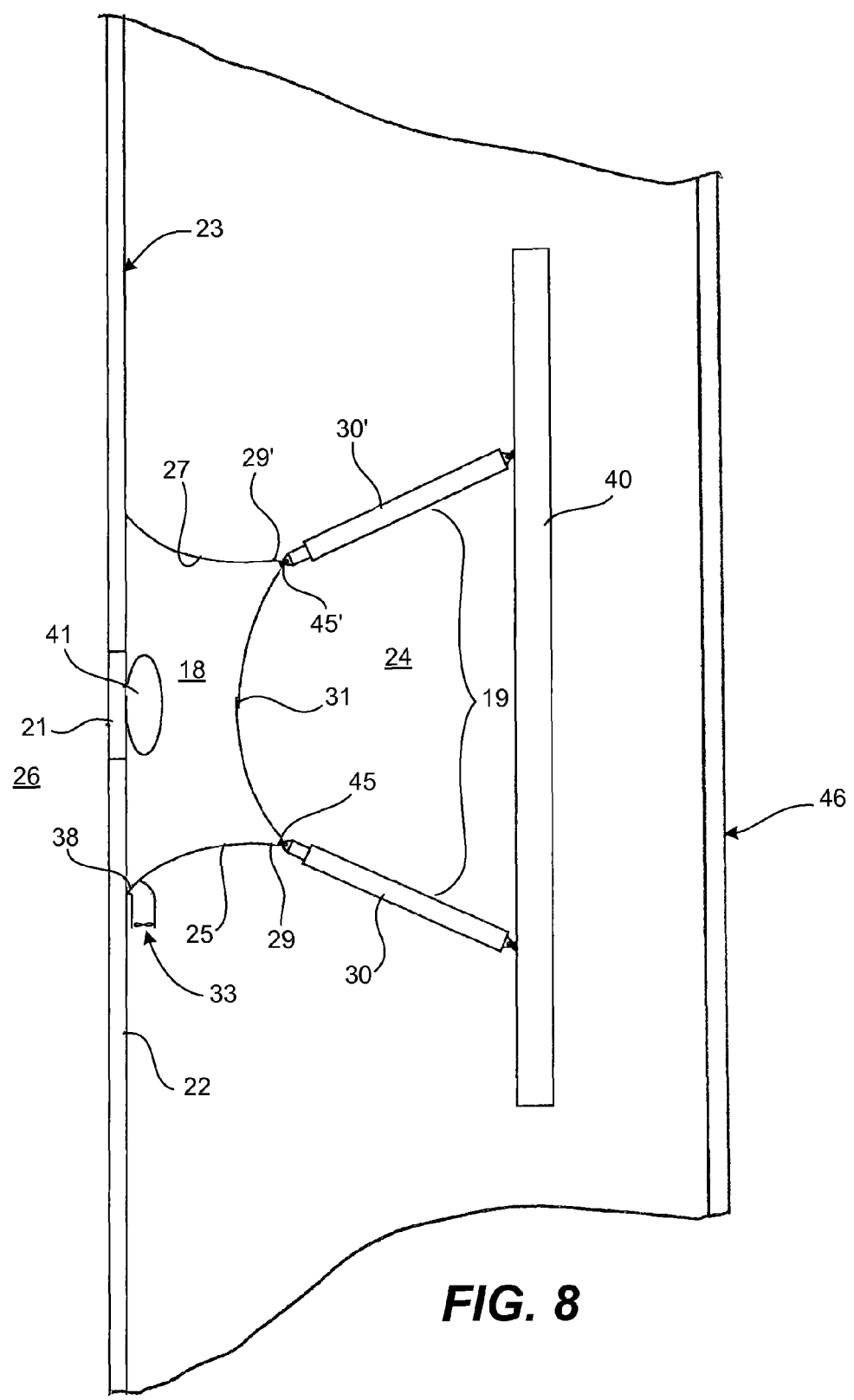
FIG. 8 is a fragmentary, side elevation view of the conformal lock assembly of FIG. 7, illustrating operation of an actuation system to move the membrane from the collapsed condition to a displaced condition.

The valve device 38 is subsequently moved from the opened condition to the closed condition, wherein the actuation system 19 is now ready to operate to create the proper vacuum therein. As indicated, the actuator devices 30, 30' are actuated to displace the membrane 25 away from the hull wall 22, as shown in FIG. 8, from the collapsed condition to the displaced condition. The low pressure space 18 within the collapsed interior pocket 27, of course, is increased, creating a vacuum as well as providing room within the membrane interior pocket 27 for entrance therein.

Figure 10:
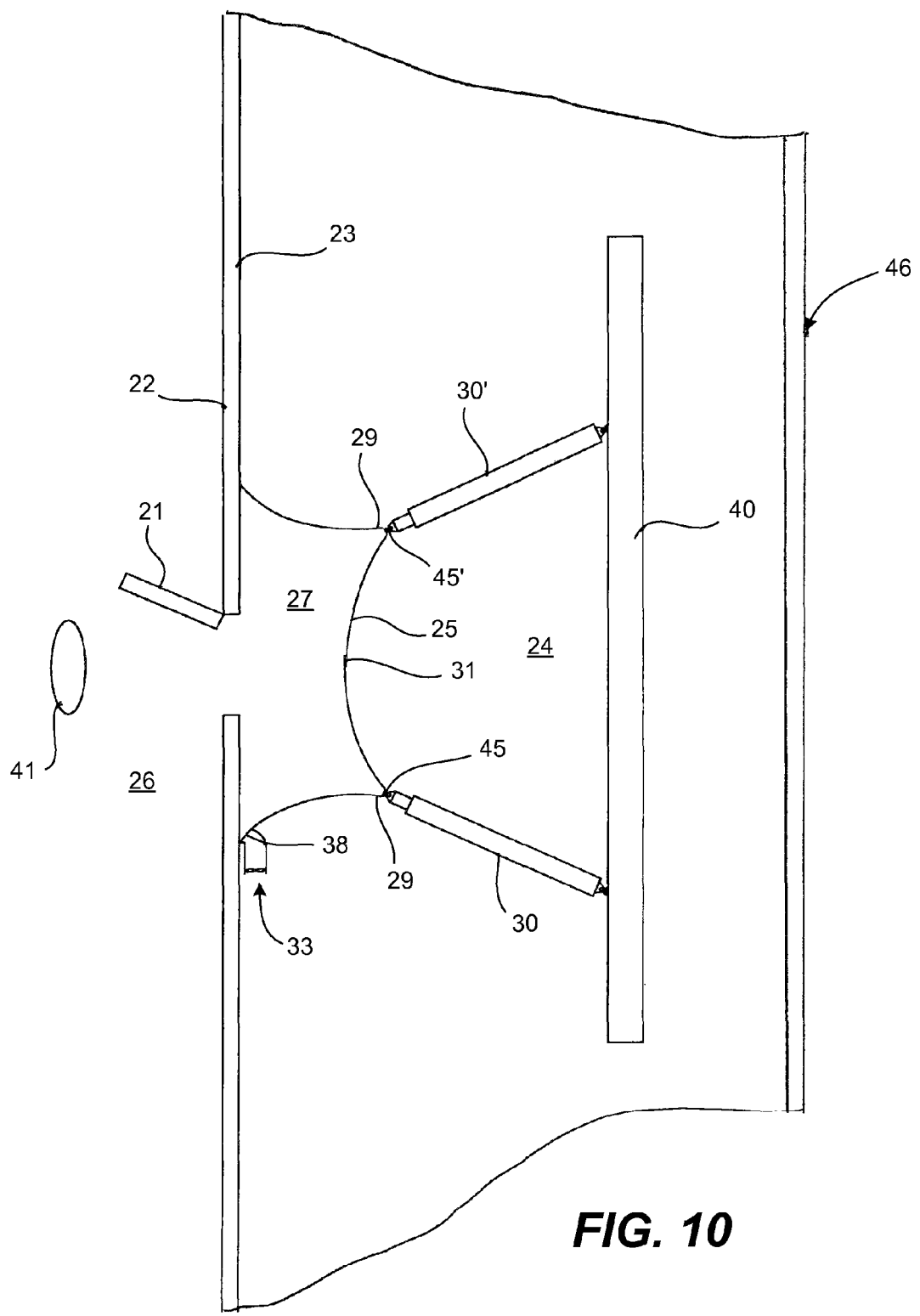
FIG. 10 is a fragmentary, side elevation view of the conformal lock assembly of FIG. 9, illustrating egress of the object from the spacecraft.

Once the proper low pressure is created, substantially proximate to that outside the hull wall 22, the door 21 can be opened, as shown in FIG. 10. Incidentally, if the airlock assembly 20 was just previously used for egress therefrom, with the door 21 still in the opened condition (FIGS. 9 and 10), the ingress procedure would commence here.

Either way, the object 41 can be moved through the door 21 and into the interior pocket 27 of the membrane, as best viewed in FIG. 9. With the actuator devices 30, 30' already displacing the membrane 25 away for the hull wall 22, in the displaced condition, a sufficient low pressure space 18 is created in the collapsed interior pocket for ingress therein.

Referring back to FIG. 8, the door 21 can then be closed (FIG. 8), sealing the interior cavity of the hull body 46 from the outside of the craft. The actuator devices 30, 30' can then be operated (extended in FIGS. 6 and 7) to allow the membrane 25 to collapse back toward the collapsed condition, hull wall 22, dissipating the generated vacuum.

The valve device 38 is then moved from the closed condition to the opened condition (FIG. 6), permitting gas flow through the communication passageway 36 of the gas displacement system 33. Moreover, the fan device 37 or pump device of the gas displacement system 33 can be operated to inflate the membrane 25 (FIGS. 5 and 4) toward the non-collapsed condition until the pressure within the interior pocket 27 is substantially equal to that of the spacecraft interior 24.

Subsequently, the resealable seam 31 can then be moved from the sealed closed condition to the opened condition (FIG. 3), allowing the object 41 to be removed from the interior pocket 27 of the membrane 25, via the opening 32 of the seam.

In a finite volume application, such as in the interior cavity of a hull body 46 of a spacecraft, the pressure in the spacecraft itself would rise as the membrane 25 is displaced by the actuator devices 30, 30' to create the low pressure space 18 within the interior pocket 27 of the membrane. This pressure increase, of course, collectively acts upon the exterior surface of the membrane 25, thereby increasing the forces necessary to displace the membrane toward its displaced condition. Hence, very powerful actuator devices are required to displace the membrane from the hull wall.

One solution would be to provide a constant volume, dual airlock assembly (not shown), wherein two airlock assemblies are placed in the space craft. These two airlock assemblies would be synchronized so that while one is inflating (pressurizing), the other is deflating (depressurizing). In this manner, there would be no pressure rise inside the interior body of the spacecraft as the airlock assemblies were cycled.

Moreover, if the two airlock assemblies were disposed on opposite sides of the craft in an opposed manner, the two membranes could be interconnected, via cables or the like. The dual airlock assemblies would be inherently synchronized. Much smaller capacity actuator devices could be applied since the forces acting upon one membrane would nearly cancel out the forces acting upon the other membrane.

If the two opposing airlock assemblies are sufficiently close and adjacent one another, the airlocks could employ a common membrane disposed therebetween. This would then eliminate the need for the interconnecting cables. A similar effect could be achieved with a lever mechanism between two airlocks on the same side of the craft.

While this invention has been described in terms of several preferred embodiments, there are alteration, permutations, and equivalents which fall within the scope of this invention. For example, the airlock assembly of the present invention may be utilized for ingress and egress for a clean room. This could be made from two membranes, instead of a hull wall and a membrane. In this embodiment, there would be no need for the actuators. In another application, the airlock assembly may have underwater applications, such as for ingress and egress for a submarine. In this application, "inside" and "outside" would be reversed in the figures. Moreover, the airlock assembly could also be applied to the field of environmental containment. This could be to keep contaminants inside a contaminated space, and/or retain contaminants out of an uncontaminated space. For example, the present invention may be applied for battlefield vehicles during a chemical or biological attack. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for ingress and egress through a door of a support wall for vehicles, modules and structures from a relatively high pressure environment inside the support wall to a relatively low pressure environment outside the support wall, said method including:

providing a flexible, gas impermeable membrane that cooperates with the support wall in an airtight manner to form an interior pocket over the door on the inside of the support wall;

displacing air from within the interior pocket of the membrane from a non-collapsed condition toward a collapsed condition, collapsing the membrane about the door on the inside of the support wall;

displacing said flexible membrane, in the collapsed condition, away from the door on the inside of the support wall, and forming a low pressure space therein, until the pressure differential between the low pressure created in the low pressure space and that on the other side of the support wall are sufficiently low so as to enable safe and free opening of the door; and opening the door of the support wall to permit one of ingress and egress therefrom.

2. The method as recited in claim 1, further including:

accessing the interior pocket of the membrane, in the non-collapsed condition, through an airtight resealable seam that cooperates with the membrane to form an opening into the interior pocket from the inside of the support wall by:

selectively operating said resealable seam between an open condition, permitting passage through said opening and into the interior pocket, and a closed condition, forming an airtight seal.

3. The method as recited in claim 2, wherein just prior to accessing the interior pocket, displacing air into the interior pocket of the membrane toward the non-collapsed condition until the pressure within the airtight interior pocket is sufficiently proximate to that of the relatively high pressure environment on the inside of the support wall.

4. The method as recited in claim 3, wherein said displacing air from within the interior pocket is performed through a gas displacement system having a passage in flow communication with the interior pocket, said method further including:

selectively operating a two-way valve disposed in the gas displacement system passage to permit or prevent the passage of air therethrough.

5. The method as recited in claim 4, wherein said displacing said flexible membrane includes one of pushing and pulling the flexible membrane away from the door through two or more actuator devices, each having one end coupled to the flexible membrane at spaced-apart locations thereof, and each having opposite ends fixedly mounted to a support structure.

6. The method as recited in claim 5, wherein said one end of said actuator devices are coupled to the flexible membrane from one of:

inside said interior pocket wherein said displacing said flexible membrane includes pushing the flexible membrane away from the door, to create the lower pressure space; and outside said interior pocket wherein said displacing said flexible membrane includes pulling the flexible membrane away from the door, to create the lower pressure space.

7. The method as recited in claim 1, wherein reinforcing said gas permeable membrane with a metallic reinforced backing.

8. A method for ingress and egress through a door of a support wall for vehicles, modules and structures including:
 providing a flexible, gas impermeable membrane that cooperates with the support wall in an airtight manner to form an interior pocket over the door on the inside of the support wall;
 displacing air from within the interior pocket of the membrane from a non-collapsed condition toward a collapsed condition, collapsing the membrane about the door on the inside of the support wall; and
 opening the door of the support wall to permit one of ingress and egress therefrom.

9. The method as recited in claim 8, further including:
 accessing the interior pocket of the membrane, in the non-collapsed condition, through an airtight resealable seam that cooperates with the membrane to form an opening into the interior pocket from the inside of the support wall by:
 selectively operating said resealable seam between an open condition, permitting passage through said opening and into the interior pocket, and a closed condition, forming an airtight seal.

10. The method as recited in claim 9, wherein,
 inside the support wall of the vehicle, module or structure is a relatively high pressure environment, while outside the support wall of the vehicle, module or structure is a relatively low pressure environment, said method further including:
 after said displacing air from within the interior pocket and prior to said opening the door, displacing said flexible membrane, in the collapsed condition, away from the door on the inside of the support wall, and forming a low pressure space therein, until the pressure differential between the low pressure created in the low pressure space and that on the other side of the support wall are sufficiently low so as to enable safe and free opening of the door.

11. The method as recited in claim 10, wherein
 said displacing said flexible membrane includes one of pushing and pulling the flexible membrane away from the door through two or more actuator devices, each having one end coupled to the flexible membrane at spaced-apart locations thereof, and each having opposite ends fixedly mounted to a support structure.

12. The method as recited in claim 11, wherein
 said one end of said actuator devices are coupled to the flexible membrane from one of:
 inside said interior pocket wherein said displacing said flexible membrane includes pushing the flexible membrane away from the door, to create the lower pressure space; and
 outside said interior pocket wherein said displacing said flexible membrane includes pulling the flexible membrane away from the door, to create the lower pressure space.

13. The method as recited in claim 9, wherein
 just prior to accessing the interior pocket, displacing air into the interior pocket of the membrane toward the non-collapsed condition until the pressure within the airtight interior pocket is sufficiently proximate to that of the relatively high pressure environment on the inside of the support wall.

14. The method as recited in claim 8, wherein
 said displacing air from within the interior pocket is performed through a gas displacement system having a passage in flow communication with the interior pocket, said method further including:
 selectively operating a two-way valve disposed in the gas displacement system passage to permit or prevent the passage of air therethrough.

* * * * *